Patented Feb. 5, 1952

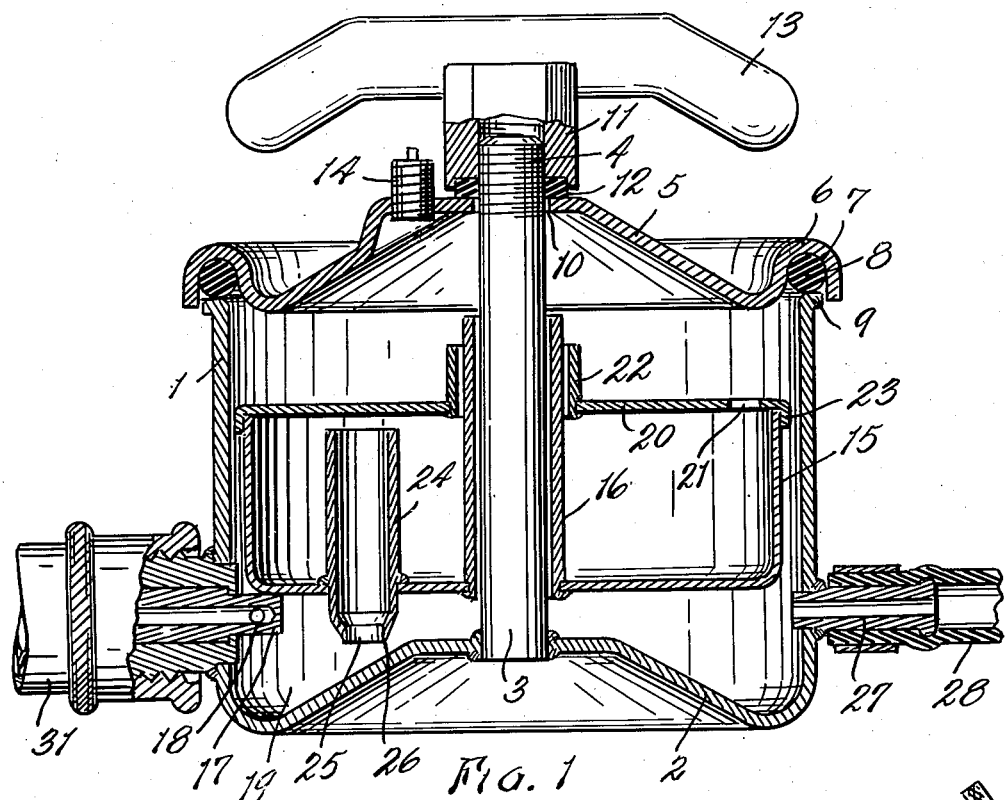
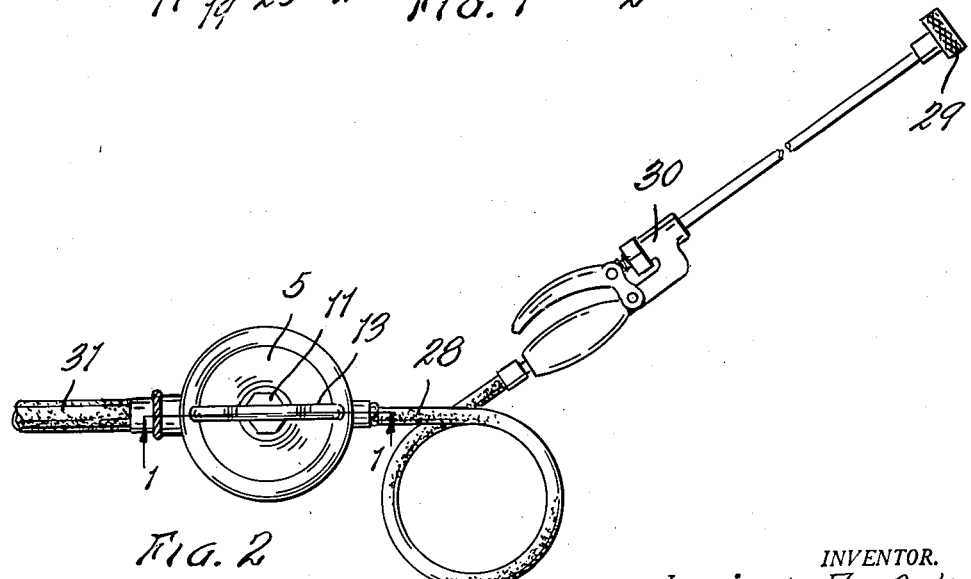

2,584,104

UNITED STATES PATENT OFFICE 2,584,104

SOLUTION MIXER AND DISTRIBUTOR

Irving E. Aske, Muskegon, Mich.

Application September 3, 1948, Serial No. 47,736

13 Claims. (Cl. 299—83)

1

This invention relates to improvements in solution mixer and distributor.

The main objects of this invention are:

First, to provide a mixing device for weed destroyer and other materials.

Second, to provide an apparatus for mixing and spraying or otherwise distributing weed destroyer solutions and the like in which the mixing is automatic and in which a substantial uniformity of solution is maintained.

Third, to provide an apparatus having these advantages which may be connected to a water supply under pressure, as by a hose, and easily carried or moved about and has a valve controlled spray nozzle associated therewith for controlling and directing the discharge as desired.

Fourth, to provide an apparatus of this character which is not likely to become clogged or inoperative and one in which materials may be used having a considerable range in solubility.

Fifth, to provide an apparatus having these advantages which is very easily operated and requires no particular skill on the part of the operator insofar as securing a suitable solution is concerned.

Sixth, to provide an apparatus of this character which is very simple and economical in its parts.

Objects relating to details and economies of the invention will appear from the description to follow. The invention is defined and pointed out in the claims.

A preferred embodiment of the invention is illustrated in the accompanying drawing, in which:

Fig. 1 is a fragmentary view of an apparatus embodying my invention mainly in vertical section on a line corresponding to line 1—1 of Fig. 2, parts being shown in full lines for convenience in illustration.

Fig. 2 is a fragmentary plan view, the parts in reduced size for convenience in illustration.

The embodiment of my invention illustrated is especially designed by me for the mixing and spraying of weed destroyer solutions using a solid or powdered form of the weed destroying chemical or composition as distinguished from a liquid form.

The structure illustrated comprises a tank 1 having a convex bottom 2 upon which is mounted the central post 3. This projects above the top of the tank and is threaded at its upper end as indicated at 4. The cover 5 is of generally concavo convex form and is provided with a downwardly facing rim 6 of channel section providing a seat

2

7 for the gasket 8 which is adapted to engage the flanged upper edge 9 of the tank. This cover has a central hole 10 therein receiving the post.

The cover clamping nut 11 is provided with a gasket 12 sealing the hole when the nut is threaded upon the post to clamp the cover in position. The nut is provided with a handle 13 which forms a handle for the receptacle. The cover is provided with a vent valve 14 positioned in a raised part thereof the purpose of which will be pointed out later.

The receptacle 15 for the chemical or material to be mixed is of such diameter that water can flow upwardly around the receptacle into the space above the receptacle. The receptacle is provided with a central tube 16 which receives the post and prevents the material within the receptacle from entering the mixing chamber other than through the eduction or discharge tube to be described. The tube 16 also serves to maintain a receptacle in upright position centrally within the tank.

The receptacle in the embodiment illustrated is further supported on the inlet nozzle 17 which has a laterally directed discharge orifice 18 positioned to discharge against the wall of the tank and set up the swirling motion in the space 19 below the receptacle which constitutes a mixing chamber. The cover 20 of the receptacle is provided with a makeup inlet opening 21 and has a collar 22 surrounding the tube and providing a vent opening in the plane above the inlet opening 21. The cover is provided with a downturned flange 23 for maintaining its position on the receptacle.

A tubular discharge or eduction tube 24 for the receptacle opens into the receptacle adjacent its upper end above the level of the material to be mixed and distributed in solution and preferably projects substantially into the mixing chamber and terminates in a restricted discharge 25 surrounded by a narrow lip 26. The discharge nipple 27 opens into the mixing chamber portion of the tank below the receptacle and a hose 28 may be connected thereto, the hose being provided with a spray head 29 controlled by the valve 30.

The discharge opening of the spray head 29 is of less capacity than the inlet opening so that with the valve 30 fully opened pressure is maintained within the tank.

In use the material to be distributed in solution is placed in the receptacle and the cover applied. The tank is connected by the hose 31 to a suitable source of fluid supply under pressure. As the fluid is turned on the vent valve 14 is opened until air is discharged from the tank. The discharge from the tank is then controlled by the valve 30. The tank may be connected to other forms of sprayers but a manually controlled and directed type of sprayer conserves material.

Where weed killer or the like is to be mixed water is used as the vehicle and I use the term water in the description although it is to be understood that other liquid vehicle may be used. The apparatus illustrated is particularly designed for mixing and discharging solutions of chemicals such as weed killers but other materials and other vehicles may be used for different purposes in which the apparatus may then become primarily a mixing apparatus which is, of course, the function of the apparatus when weed killer and water are to be mixed.

The incoming water flows upwardly around the receptacle and into the same through the inlet port 21, or opening, air being vented from the receptacle through the collar 22 so that the receptacle cannot become air bound. Water mixes in the receptacle with the material to be discharged and normally is discharged in dissolved form through the discharge tube 24 into the mixing chamber where it is diluted and mixed with water which is swirled about in the mixing chamber to secure a uniform solution to be discharged through the discharge connection 27. The projection of the discharge tube into the chamber 19 a substantial distance results in an effective suction and also the restriction surrounded by a relatively thin edge or lip prevents bubbles collecting around the discharge which might impede or interfere with the suction discharge.

It will be noted that the eduction into the receptacle tube 24 opens adjacent the top thereof, it should open into the receptacle above the level of the chemical such as weed killer in powdered or solid form. When water is admitted into the receptacle sufficient of the weed killer or chemical is dissolved to produce a saturate solution within the receptacle. As the makeup water enters the receptacle it becomes a saturate solution and water drawn into the mixing chamber through the eduction or suction tube is a saturate solution. The liquid is delivered into the mixing chamber under pressure so as to produce a swirling action and this results in a suction at the lower end of the eduction tube which is proportional to the velocity of the swirling liquid in the mixing chamber. Since the velocity and volume of the water discharged is also proportional to the applied pressure at the inlet nozzle 17, a uniform concentration of chemical per gallon of liquid results. Uniformity of concentration will continue until all of the powdered soluble chemical, such as for example, weed killer, is dissolved. It should be noted that none of the chemical leaves the receptacle 15 in solid form as the quantity of powdered chemical placed within the receptacle is of less depth than the height of the tube 24.

I have stated that the discharge capacity of the discharge orifice is less than that of the inlet and I have found that a desirable degree of swirl in the mixing chamber results when the opening in the inlet orifice 18 is approximately three times the area of the discharge orifice of the spray head 29. If the opening in the inlet orifice is too great in proportion to the discharge orifice of spray head the flow of liquid across the discharge of the eduction tube will not result in the desired discharge of the saturate solution.

It will be appreciated that uniformity in concentration delivered is greatly to be desired. For example, in the use of weed killer there is quite a narrow range in concentration where a slight increase will kill lawn grasses, and a decrease will not kill weeds. The apparatus may be used under a wide range of liquid vehicle pressures and the uniformity of concentration in the solution delivered is maintained throughout such range. The makeup liquid in the receptacle is under substantially the same pressure as the liquid in the mixing chamber so that it is a matter of the suction on the eduction tube which varies with the liquid discharge that maintains the uniformity of the mixture throughout these varying conditions.

My apparatus is very simple and easy to operate, it only being necessary to introduce the desired amount of material in the receptacle, close the cover and turn on the water, the vent 14 being opened until air is discharged from the tank. The discharge of the solution may be entirely controlled by the valve 30.

The structure illustrated is designed to be carried about by the handle although the bottom is so designed that the tank may be pulled about in an upright position if that is desired. It is obvious that the size may be varied as desired, Fig. 1 being approximately the size of an apparatus which I found satisfactory for domestic use.

I have illustrated and described my invention in a simple and practical embodiment thereof. I have not attempted to illustrate various modifications and adaptations which I contemplate as it is believed that this disclosure will enable those skilled in the art to embody or adapt the same as may be desired.

Having thus described my invention, what I claim as new and desire to secure by Letters Patent is:

1. In an apparatus of the class described the combination of a cylindrical tank provided with a centrally positioned post, a receptacle having a central open ended tube projecting upwardly from the bottom thereof and loosely engageable over said post, a cover for said receptacle provided with an upwardly projecting central collar loosely embracing said tube on said receptacle with the upper end of the collar below the top of the tube, the cover being provided with an opening in a plane below the upper end of the collar, a discharge for said receptacle, a water supply nozzle projecting into said tank and having a laterally directed discharge acting to induce a swirling movement of the water in said tank below the receptacle, the receptacle being of such dimension as to permit water to pass therearound upwardly into the tank above the receptacle, the nozzle constituting a support for said receptacle, and a valved discharge for said tank communicating therewith below the bottom of the receptacle.

2. In an apparatus of the class described the combination of a cylindrical tank provided with a centrally positioned post, a receptacle having a central open ended tube projecting upwardly from the bottom thereof and loosely engageable over said post, a cover for said receptacle provided with an upwardly projecting central collar loosely embracing said tube on said receptacle with the upper end of the collar below the top of the tube, the cover being provided with an opening in a plane below the upper end of the collar, a tubular discharge for said receptacle disposed with its upper end adjacent the top of the receptacle and its lower end projecting below the bottom of the receptacle and terminating in a relatively restricted discharge opening surrounded by a thin edge, a water supply nozzle projecting into said tank and having a laterally directed discharge acting to induce a swirling movement of the water in said tank below the receptacle, the receptacle being of such dimension as to permit water to pass therearound upwardly into the tank above the receptacle, the nozzle constituting a support for said receptacle, and a valved discharge for said tank communicating therewith below the bottom of the receptacle.

3. In an apparatus of the class described, the combination of a tank provided with a centrally positioned post, a receptacle for the ingredient to be mixed with a liquid vehicle means for supporting the receptacle within the tank in spaced relation to the bottom thereof said receptacle having a central tube receiving said post, a cover for said receptacle provided with an upwardly projecting collar embracing said tube on said receptacle with the upper end of the collar below the top of the tube, the cover being provided with an opening in a plane below the upper end of the collar, a suction tube opening to said receptacle above the level of the ingredient therein and opening to deliver to said tank below the receptacle, a liquid inlet to the tank directed to induce a swirling movement of the liquid in said tank below the receptacle, and discharge for said tank opening thereto below the receptacle.

4. In an apparatus of the class described, the combination of a tank provided with a centrally positioned post, a receptacle, means for supporting the receptacle within the tank in spaced relation to the bottom thereof, said receptacle having a central tube receiving said post, a cover for said receptacle provided with an upwardly projecting collar embracing said tube on said receptacle with the upper end of the collar below the top of the tube, the cover being provided with an opening in a plane below the upper end of the collar, an eduction tube opening to said receptacle adjacent the top thereof and opening to deliver to said tank below the receptacle, a liquid inlet to the tank directed to induce a swirling movement of the liquid in said tank below the receptacle, and discharge for said tank opening thereto below the receptacle.

5. An apparatus of the class described comprising a tank provided with a vent valve at the top thereof, a closed receptacle supported within said tank in spaced relation to the bottom of the tank providing a mixing chamber, means for supporting said receptacle in said tank, the mixing chamber being in communication with the space of the tank above the receptacle, the receptacle being provided with a make up fluid opening adjacent the top thereof and provided with a vent opening to the tank above the plane of the said make-up opening, an eduction tube opening to said mixing chamber and opening to the receptacle adjacent the top thereof, a liquid delivery connection directed tangentially into said mixing chamber to induce a swirling movement of the water therein, and a discharge for the said mixing chamber.

6. An apparatus of the class described comprising a tank, a receptacle supported within said tank in spaced relation to the bottom thereof, means for supporting said receptacle in said tank, the space below the receptacle constituting a mixing chamber, the mixing chamber being in communication with the space of the tank above the receptacle, the receptacle being provided with a top having an opening therein, a discharge for the receptacle delivering outside said receptacle into said tank, said discharge receiving from said receptacle at a substantial distance above the bottom thereof, the bottom of the receptacle and the side walls thereof to a substantial distance above said bottom being closed against discharge therefrom except through said discharge receiving from the receptacle a substantial distance above said bottom, a liquid connection tangentially directed into said mixing chamber to induce a swirling movement of the liquid therein, and a discharge for the tank opening to the said mixing chamber thereof.

7. An apparatus of the class described comprising a tank, a receptacle supported within said tank in spaced relation to the bottom of the tank providing a mixing chamber below the receptacle, means for supporting said receptacle in said tank, the receptacle being provided with a liquid make-up connection with the liquid in the mixing chamber, a discharge for the receptacle opening outside said receptacle into said tank, said discharge receiving from said receptacle at a substantial distance above the bottom thereof, the bottom of the receptacle and the side walls thereof to a substantial distance above said bottom being closed against discharge therefrom except through said discharge receiving from the receptacle a substantial distance above said bottom, a liquid supply connection directed into said mixing chamber to induce a swirling movement of the water therein, and a discharge for the tank opening to the said mixing chamber thereof.

8. An apparatus of the class described, comprising a tank, a receptacle for a soluble material to be mixed with a liquid vehicle supported within the tank in spaced relation to the bottom thereof providing a mixing chamber below the receptacle, means for supporting said receptacle in said tank, the receptacle having a make-up liquid connection with the liquid in the mixing chamber, an eduction tube opening to the receptacle in a plane above the plane of the material to be mixed and to said mixing chamber, a supply connection for fluid under pressure directed into said mixing chamber to induce a swirling movement of the liquid therein across the discharge end of said eduction tube, and a controlled discharge for said mixing chamber, the liquid supply connection to the mixing chamber having a capacity substantially exceeding the full discharge capacity of the discharge.

9. An apparatus of the class described, comprising a tank, a receptacle for a soluble material to be mixed with a liquid vehicle supported within the tank in spaced relation to the bottom thereof providing a mixing chamber below the receptacle, means for supporting said receptacle in said tank, said receptacle having a make-up liquid connection with the liquid in the mixing chamber, an eduction tube opening to the receptacle in a plane above the plane of the material to be mixed and to said mixing chamber, a supply connection for fluid under pressure directed into said mixing chamber to induce a movement of the liquid therein across the discharge end of said eduction tube, and a discharge for said mixing chamber.

10. An apparatus of the class described comprising a mixing chamber, a receptacle for a soluble ingredient to be mixed in solution with a liquid vehicle, means for supporting said receptacle in said chamber, said receptacle being in communication with the mixing chamber so that make-up liquid is supplied to the receptacle and the liquid in the receptacle is subject to the pressure of the liquid within the mixing chamber, a suction tube opening to said mixing chamber and opening to said receptacle above the level of the soluble ingredient therein, the make-up opening to said receptacle being above the plane of the inlet of the suction tube, the receptacle having a vent opening to the mixing chamber above the plane of the make-up connection for the receptacle, a supply connection for a liquid vehicle under pressure directed to induce a swirling movement of the liquid within the mixing chamber across the opening of the suction tube into the mixing chamber and thereby inducing suction within the suction tube, and a discharge for the mixing chamber.

11. An apparatus of the class described comprising a mixing chamber, a receptacle for a soluble ingredient to be mixed in solution with a liquid vehicle, means for supporting said receptacle in said chamber, said receptacle being in communication with the mixing chamber so that make-up liquid is supplied to the receptacle and the liquid in the receptacle is subject to the pressure of the liquid within the mixing chamber, a suction tube opening to said mixing chamber and opening to said receptacle above the level of the soluble ingredient therein, the make-up opening to said receptacle being above the plane of the inlet of the suction tube, a supply connection for a liquid vehicle under pressure directed to induce a movement of the liquid within the mixing chamber across the opening of the suction tube into the mixing chamber and thereby inducing suction within the suction tube, and a discharge for the mixing chamber.

12. An apparatus of the class described comprising a mixing chamber, a receptacle for a soluble ingredient to be mixed in solution with a liquid vehicle, means for supporting said receptacle in said chamber, said receptacle being in communication with the mixing chamber so that make-up liquid is supplied to the receptacle and the liquid in the receptacle is subject to the pressure of the liquid within the mixing chamber, a suction tube opening to said mixing chamber and opening to said receptacle above the level of the soluble ingredient therein, the make-up opening to said receptacle being above the plane of the inlet of the suction tube, a supply connection for a liquid vehicle under pressure directed to induce a movement of the liquid within the mixing chamber across the opening of the suction tube into the mixing chamber and thereby inducing suction within the suction tube, and a discharge for the mixing chamber of less capacity than the capacity of the liquid inlet connection.

13. An apparatus of the class described comprising a mixing chamber, a receptacle for an ingredient to be mixed in solution with a liquid vehicle, means for supporting said receptacle in communication with the mixing chamber so that make-up liquid is supplied to the receptacle subject to the pressure of the liquid within the mixing chamber, a suction tube opening to said mixing chamber and opening to said receptacle adjacent the top thereof, a supply connection for a liquid vehicle under pressure directed to induce a movement of the liquid within the mixing receptacle across the opening of the suction tube into the mixing chamber and thereby inducing suction within the suction tube, and a discharge for the mixing chamber of less capacity than the capacity of the liquid inlet connection.

IRVING E. ASKE.

REFERENCES CITED

The following references are of record in the file of this patent:

UNITED STATES PATENTS

| Number | Name | Date |
|---|---|---|
| 870,270 | Brown | Nov. 5, 1907 |
| 1,185,319 | Hodell | May 30, 1916 |
| 1,468,541 | Nagues | Sept. 18, 1923 |
| 1,510,062 | Kenney | Sept. 30, 1924 |
| 1,582,225 | Pulkinghorn | Apr. 27, 1926 |
| 1,911,366 | Kitto et al. | May 30, 1933 |
| 1,923,266 | Houpert | Aug. 22, 1933 |
| 2,348,334 | Ellinger | May 9, 1944 |